Patented Mar. 5, 1935

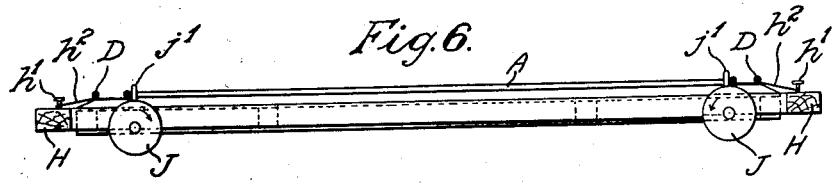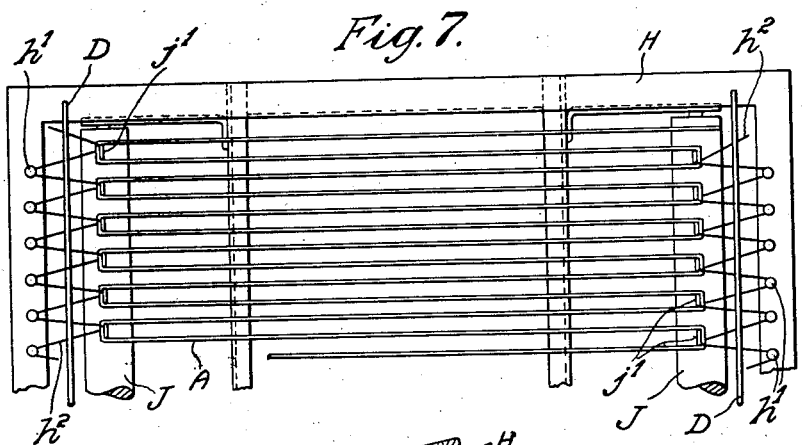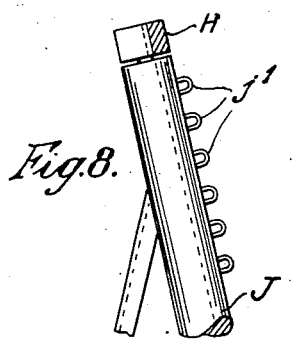

1,993,348

UNITED STATES PATENT OFFICE 1,993,348

APPARATUS FOR MANUFACTURE OF ELECTRIC HEATING PANELS OR THE LIKE

Joseph Leslie Musgrave and Leonard John Fowler, London, England

Application August 18, 1932, Serial No. 629,352
In Great Britain September 21, 1931

6 Claims. (Cl. 140—93)

Our invention has reference to novel apparatus for use in the manufacture of electrical heating panels which are adapted to be incorporated in a building as a part of the wall, floor or ceiling structure.

The primary object of the invention is to provide novel means for supporting the resistance wire during the manufacture of the panel. Other objects will appear from the following description.

The panel consists of a grid of thin wire, which may or may not be previously insulated, arranged in zig-zag or parallel formation on a sheet of paper, linen or similar insulating material over which another sheet of the material is stuck, so that the wires are then held in position between the two sheets. The panels are then subjected to pressure, and heat if necessary, thus the wire becomes embedded in the sheets and is rendered invisible and forms no unevenness on the surface. The sheets of material between which the wire is embedded may be of continuous lengths or rolls from which the panels are cut to convenient sizes and then fixed to the ceiling, etc., the remaining portion or portions of the ceiling being afterwards covered with paper, linen, leather or other suitable material of the same thickness as the composite panel. The joints are carefully butted together and, if necessary the whole of the ceiling can be decorated in such a way that the joints are hidden.

Conductors or bus-bars may be fixed along two or more sides when forming the panels so that electrical connections can be taken from each of the four corners, and two or more panels can be connected together and fed from the same pair of mains.

If necessary the bus-bars may be made of metal tape, which can be punched with eyelets to form a simple method of making an electrical connection.

In order that the invention may be clearly understood we have appended the accompanying drawings.

Fig. 4 is a cross sectional view of a table with pins fixed in the requisite positions along either side, showing the pins penetrating the sheets of insulating material, with the grid interposed between the two sheets of insulating material.

Fig. 5 is a similar view to Fig. 4 showing the wire wound onto hooks arranged on arms provided on the table for the purpose.

Fig. 6 is a sectional view showing the grid held on a frame by threads passing over pins fixed in said frame with the headers or bus-bars also held on said frame.

Fig. 7 is a broken plan view of Fig. 6.

Fig. 8 is a broken part sectional end elevation showing the position in which the frame is arranged or supported when forming and securing the grid to said frame.

Figure 1:
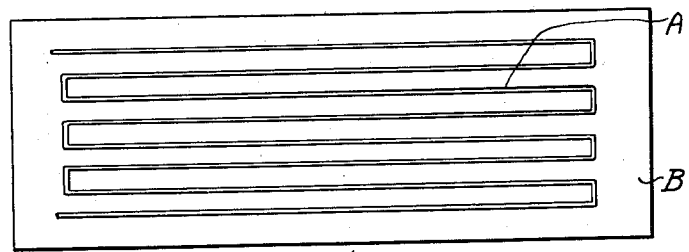
Fig. 1 is a plan view showing a grid of thin wire, forming a single panel, arranged in parallel formation on a sheet of paper or insulating material, ready to receive the other sheet of paper which holds the grid in position between said sheets.
Figure 2:
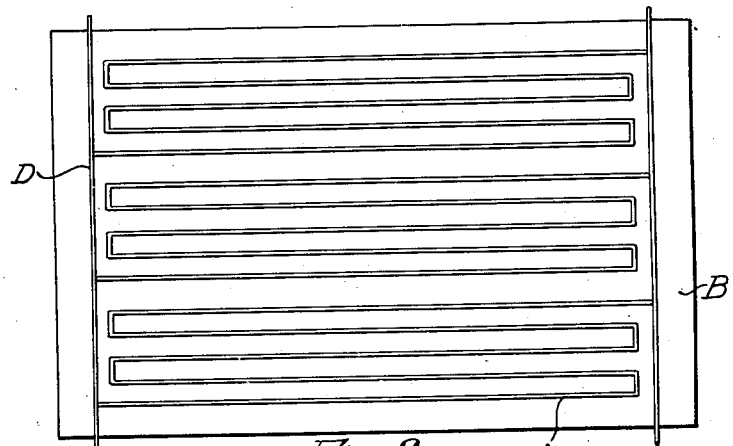
Fig. 2 is a similar view to Fig. 1 showing three grids or panels arranged on a sheet of paper or insulating material with a conductor or bus-bar fixed along either side to which each panel is connected to enable them to be fed from the same pair of mains.
Figure 3:
Fig. 3 is a broken view showing how a number of grids or panels may be arranged on a roll of paper or insulating material.

A represents the grid of thin wire forming the panel, B the sheet of paper, linen, or similar insulating material on which the grid is arranged, and D the bus-bars from which the electrical connections are taken.

Referring to the method of constructing the panels shown by Fig. 4, we employ a table E on either side of which pins or pointed pegs $e^1$ are fixed in the requisite positions. The lower sheet of paper, linen, or other material B is first placed upon this table, the pins $e^1$ penetrating such material. The wire A is then wound in the desired formation on the pins $e^1$, and when conductors or bus-bars are employed, such bus-bars are arranged along either end of the lower sheet B, being soldered or connected up where necessary. The adhesive material is now applied and then the top sheet of paper $B^1$ laid on so that the wires are held in position between the two sheets B and $B^1$. When the adhesive material is partially dry remove the sheets from the table and pass them through rolls, preferably heated, and finally trim the edges, when the panel is ready to be fixed in position.

In the construction illustrated by Fig. 5 instead of fixing pins in the table E we provide at either side of said table a movable or slidable arm or band F, on which arms or bands a number of hooks $f^1$, suitably spaced apart, are arranged, which hooks $f^1$ are turned or revolved to release the wires as and when required.

The lower sheet B is first placed on the table E, and then the wire A is wound in parallel or zig-zag formation onto the hooks $f^1$, sufficient sag being allowed to permit the wire to touch the sheet B for the greater part of its length. The adhesive material is now applied and then the top sheet B¹ laid on, the ends projecting upwards as shown, and when the adhesive material is partially dry the hooks f¹ are operated to free the wire A, and after the arms or bands F have been removed the ends of the upper sheet B¹ can be pressed onto the lower sheet and the edges trimmed, the panel being then passed through rolls as previously stated.

At Figs. 6 and 7 we have shown a further method of constructing a panel according to this invention. In this case we provide a frame H in which a number of pins h¹ suitably spaced apart are provided. The wire A, which is wound in parallel or zig-zag formation between opposite ends of this frame on staples j¹ fixed in rollers or drums J suitably mounted to enable them to be revolved or turned in an inward direction, is held and suspended in said frame H by cotton, silk, or other thread h² passed over the pin h¹, the headers or bus-bars D being also held between the frame, as clearly shown by Fig. 7. After the operation of supporting or suspending the grid of wire in the frame H is completed and the rollers or drums J have been operated or revolved in an inward direction to withdraw the staples from between the wires, said frame is then placed over the lower sheet B, to which the adhesive material previously has been applied, and then the upper sheet B¹ placed in position on top, and when the adhesive material is partially dry the sheets are released from the frame H by severing the threads h², and the edges trimmed, the grid or panel being then passed through the rollers as previously described.

When it is desired to construct the panels in continuous rolls by the method illustrated in Fig. 4 the table E carrying the pins is made movable. The lower roll of insulating material is passed between rollers on to the table and is perforated by the pins. The wire and bus-bars are then wound on to the pins, the adhesive applied, and the lower roll with the wires is then passed between rollers together with the top roll of insulating material, the pins being withdrawn as this part of the operation proceeds, and the complete panel then passed through rollers, preferably heated, and its edges trimmed.

When it is desired to construct the panel in continuous rolls by the method illustrated in Fig. 5, the table E is made movable and the hooks are fixed on bands, which move along each side of the table at the same speed. The lower roll of insulating material moves with the table. The wires and the bus-bars are wound on to the hooks, said wires being allowed to sag to touch the insulating material. The adhesive material is applied and the lower roll of insulating material as it travels forward with the wires then passing through rollers together with the upper roll of insulating material, which is fed in from above so that the wires are held in position by the two rolls of insulating material. The hooks are then operated to release the wires, and the panel may then be passed between two more rollers, to stick the two sheets together. Or this operation of sticking the sheets together may be accomplished when the panel is passed between the final pressing rollers, which are preferably heated.

If it is desired to construct the panel in continuous rolls according to the method illustrated in Figs. 6 and 7, we form the frame carrying the pins on which the threads supporting the wires are wound of two travelling bands, and fix the staples on which the wires are wound in travelling bands instead of rollers. When the process of wiring and supporting the grid is completed, the staple bands as they travel along withdraw the staples from between the wires, the wires which are now held by the threads travelling forward and pass between the two rolls of insulating material to complete the operation as previously stated.

The sheets of paper may be treated to render them fire-proof before the beginning of or at any time during the process. If preferred we may incorporate an insulating medium either by impregnation or by stretching a layer of insulating material on one or both sides of the element during the process or after manufacture.

What we claim as our invention and desire to secure by Letters Patent is:—

1. In a device of the class described, a support, slidably and oppositely arranged elements arranged on said support for holding a sheet of insulating material, and hooks carried by said elements, said hooks serving as connecting points for a panel wire and spaced to permit the wire to touch the sheet of insulating material for the greater part of its length.

2. The structure of claim 1, characterized by said hooks being rotatably mounted.

3. In a device of the class described a support, rotatable elements carried at the ends of said support, said rotatable elements having means for attaching wire thereto, and means for preventing said rotatable elements from turning when wire has been connected to the same.

4. The structure of claim 3 characterized by said means for preventing said rotatable elements from turning consisting of fixed pins carried by the support and ties attached thereto and connected to the rotatable elements.

5. In a device of the class described a frame, rollers mounted in said frame at opposite ends thereof, upstanding elements carried by said rollers, pins carried by said frame, means connecting said elements and pins for normally preventing the rotation of the rollers when wire has been laced between the rollers and to the upstanding elements.

6. In a device of the class described, a support, a plurality of wire holding elements at opposite ends of said supports and having wire-engaging portions, and means swingably mounting said wire holding elements whereby the same may be actuated to release the wire from said wire engaging portions.

JOSEPH LESLIE MUSGRAVE.
LEONARD JOHN FOWLER.